US006338830B1

(12) United States Patent
Moskovitz et al.

(10) Patent No.: US 6,338,830 B1
(45) Date of Patent: *Jan. 15, 2002

(54) ABSORBENT AND/OR CATALYST AND BINDER SYSTEM AND METHOD OF MAKING AND USING THEREFOR

(75) Inventors: Mark L. Moskovitz; Bryan E. Kepner, both of Atlanta, GA (US)

(73) Assignee: Apyron Technologies, Inc., Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/282,966

(22) Filed: Mar. 31, 1999

Related U.S. Application Data

(60) Division of application No. 08/734,330, filed on Oct. 21, 1996, now Pat. No. 5,948,726, and a continuation-in-part of application No. 08/662,331, filed on Jun. 12, 1996, now abandoned, and a continuation-in-part of application No. PCT/US96/05303, filed on Apr. 17, 1996, which is a continuation-in-part of application No. PCT/US95/15829, filed on Jun. 12, 1995, which is a continuation-in-part of application No. 08/426,981, filed on Apr. 22, 1995, now abandoned, which is a continuation-in-part of application No. 08/351,600, filed on Dec. 7, 1994, now abandoned.

(51) Int. Cl.$^7$ .............................................. B01D 47/00

(52) U.S. Cl. ................... 423/210; 210/660; 502/400; 502/406; 502/408; 502/414; 502/324; 502/331; 502/336; 502/338; 502/342; 502/345; 502/346; 502/349; 502/350; 502/351; 502/353; 502/354; 502/355

(58) Field of Search ............................... 502/400, 406, 502/408, 414, 439, 239, 241, 242, 244, 247, 324, 331, 336, 338, 342, 345, 346, 349, 350, 351, 353, 354, 355; 423/604, 605, 608, 610, 626, 628, 210; 210/660

(56) References Cited

U.S. PATENT DOCUMENTS

| 2,915,365 A | 12/1959 | Sausso |
| 3,158,578 A | 11/1964 | Pons et al. |
| 3,222,129 A | 12/1965 | Osment et al. |

(List continued on next page.)

FOREIGN PATENT DOCUMENTS

| EP | 0 224 375 A2 | 6/1987 |
| EP | 0 395 203 | 10/1990 |
| EP | 0 525 631 A1 | 2/1993 |

(List continued on next page.)

OTHER PUBLICATIONS

Fukuzuka et al. Oxyacid Anion Adsorbent, 91: 9908p; *Chemical Abstracts*, vol. 91, 1979, p. 310.

Youssef et al. Oxidation of Carbon Monoxide Over Alumina–Supported Metal Oxide Catalysts, vol. 12, No. 4, pp. 335–343, 1995.

Sultan et al. Catalytic Dehydrogenation and Cracking of Cyclohexane over $Ni/Al_2O_3$ Solids, Adsorption Science & Technology, vol. 12, No. 1, pp. 1–6, 1995.

Jha et al. Chromatographic Utilization of the Sorption Behaviour of Some Nitrophenols on Acid–treated Alumina, Absorption Science & Technology, vol. 9, No. 2, pp. 92–108, 1992.

Ames et al., "Phosphorus Removal From Effluents in Alumina Columns," *J. Water Pollution Control Federation*, vol. 42, No. 5, Part 2, pp. R161–R172 (May 1970).

Batchelor et al., "A Surface Complex Model for Adsorption of Trace Components from Wastewater," *J. Water Pollution Control Federation*, vol. 59, No. 12, pp. 1059–1068 (Dec. 1987).

Brattebo et al., "Phosphorus Removal By Granular Activated Alumina," *Wat.Res.*, vol. 20, No. 8, pp. 977–986 (1986).

Huang, "Removal of Phosphate By Powdered Aluminum Oxide Adsorption," *J. Water Pollution Control Federation*, vol. 7, pp. 1811–1817 (Aug. 1977).

Gangoli et al., "Phosphate Adsorption Studies," *J. Water Pollution Control Federation*, vol. 45, No. 5, pp. 842–849 (May 1973).

Gangoli et al., "Kinetics of Phosphate Adsorption on Alumina and Fly Ash," vol. 46, No. 8, pp. 2035–2042 (Aug. 1974).

Neufeld et al., "Removal of Orthophosphates form Aqueous Solutions with Activated Alumina," *Environmental Science and Technology*, vol. 3, No. 7, pp. 661–667 (Jul. 1969).

Shiao et al., "Phosphate Removal from Aqueous Solution from Activated Red Mud," *Water Pollution Control Federation*, vol. 49, pp. 280–285 (Feb. 1977).

Urano et al., "Process Development for Removal and Recovery of Phosphorus from Wastewater by a New Adsorbent. 1. Preparation Method and Adsorption Capability of a New Adsorbent," *Ind.Eng.Chem.Res.*, vol. 30, No. 8, pp. 1893–1896 (1991).

(List continued on next page.)

*Primary Examiner*—Steven P. Griffin
*Assistant Examiner*—Christina Ildebrando
(74) *Attorney, Agent, or Firm*—Needle & Rosenberg, P.C.

(57) ABSTRACT

The invention relates to a method for producing an adsorbent and/or catalyst and binder system comprising I) mixing components comprising (a) a binder comprising a colloidal metal oxide or colloidal metalloid oxide, (b) an oxide adsorbent and/or catalyst particle, and (c) an acid, (ii) removing a sufficient amount of water from the mixture to cross-link components a and b to form an adsorbent and/or catalyst and binder system. The invention also relates to particles made by the process, binders, and methods for remediating contaminants in a stream.

56 Claims, No Drawings

U.S. PATENT DOCUMENTS

| | | |
|---|---|---|
| 3,360,134 A | 12/1967 | Pullen |
| 3,485,771 A | 12/1969 | Horvath |
| 3,726,811 A | 4/1973 | Toombs et al. |
| 3,819,532 A | 6/1974 | Cracknell et al. |
| 3,875,125 A | 4/1975 | Whitehurst |
| 3,935,098 A | 1/1976 | Oda et al. |
| 3,945,945 A | 3/1976 | Kiovsky et al. |
| 3,958,341 A | 5/1976 | Podschus |
| 3,997,476 A | 12/1976 | Cull |
| 4,017,425 A | 4/1977 | Shiao |
| 4,051,072 A | 9/1977 | Bedford et al. |
| 4,125,457 A | 11/1978 | Brennan et al. |
| 4,166,100 A | 8/1979 | Vorobiev et al. |
| 4,177,139 A | 12/1979 | Hahn et al. |
| 4,279,782 A | 7/1981 | Chapman et al. |
| 4,349,637 A | 9/1982 | Miedaner et al. |
| 4,393,311 A | 7/1983 | Feldman et al. |
| 4,442,223 A | 4/1984 | Chester et al. |
| 4,499,208 A | 2/1985 | Fuderer |
| 4,508,835 A | 4/1985 | Kaniuk et al. |
| 4,547,487 A | 10/1985 | Vogel et al. |
| 4,551,254 A | 11/1985 | Imada et al. |
| 4,558,031 A | 12/1985 | Ternan et al. |
| 4,579,839 A | 4/1986 | Pearson |
| 4,764,394 A | 8/1988 | Conrad |
| 4,795,735 A | 1/1989 | Liu et al. |
| 4,835,338 A | 5/1989 | Liu |
| 4,843,034 A | 6/1989 | Herndon et al. |
| 4,874,596 A | 10/1989 | Lemelson |
| 4,885,065 A | 12/1989 | Gilgenbach |
| 4,902,666 A | 2/1990 | Rainis |
| 4,923,843 A | 5/1990 | Saforo et al. |
| 5,053,374 A | 10/1991 | Absil et al. |
| 5,087,589 A | 2/1992 | Chapman et al. |
| 5,204,070 A | 4/1993 | Wilson et al. |
| 5,212,131 A | 5/1993 | Belding |
| 5,218,179 A | 6/1993 | Matossian et al. |
| 5,227,358 A | 7/1993 | Takemura et al. |
| 5,236,471 A | 8/1993 | Van Dijen |
| 5,238,888 A | 8/1993 | Abe |
| 5,242,879 A | 9/1993 | Abe et al. |
| 5,244,648 A | 9/1993 | Dupin et al. |
| 5,262,198 A | 11/1993 | Wu et al. |
| 5,346,722 A | 9/1994 | Beauseigneur et al. |
| 5,366,948 A | 11/1994 | Absil et al. |
| 5,414,204 A | 5/1995 | Hosono et al. |
| 5,422,323 A | 6/1995 | Banerjee et al. |
| 5,427,995 A | 6/1995 | Ziebarth et al. |
| 5,948,726 A * | 9/1999 | Moskovitz et al. .......... 502/415 |
| 5,985,790 A * | 11/1999 | Moskovitz et al. .......... 502/415 |

FOREIGN PATENT DOCUMENTS

| | | |
|---|---|---|
| FR | 2527197 | 5/1982 |
| GB | 604947 | 11/1945 |
| JP | 53-31599 | 3/1976 |
| JP | 54-31586 | 3/1978 |
| JP | 54-10288 | 1/1979 |
| JP | 54-28287 | 3/1979 |
| JP | 54-141375 | 11/1979 |
| JP | 56-121637 A2 | 9/1981 |
| JP | 56-121637 | 9/1981 |
| JP | 61233065 A2 | 10/1981 |
| JP | 57-171435 | 10/1982 |
| JP | 58-156349 | 9/1983 |
| JP | 60-255681 | 12/1985 |
| JP | 63-062546 | 3/1988 |
| JP | 1164781 | 6/1989 |
| JP | 4-23577 | 4/1992 |
| PL | 159625 | 9/1990 |
| RO | 98720 | 4/1990 |
| WO | WO 94/26661 | 11/1994 |
| WO | WO 96/17682 | 6/1996 |
| WO | WO 96/33013 | 10/1996 |

OTHER PUBLICATIONS

Urano et al., "Process Development for Removal and Recovery of Phosphorus from Wastewater by a New Adsorbent. 2. Adsorption Rates and Breakthrough Curves," *Ind.Eng.Chem.Res.*, vol. 30, No. 8, pp. 1897–1899 (1991).

Winkler et al., "Kinetics of Orthophosphate Removal from Aqueous Solutions by Activated Alumina," *J. Water Pollution Control Federation*, vol. 43, No. 3, Part 1, pp. 474–482 (Mar. 1971).

Yee, "Selective Removal of Mixed Phosphates by Activated Alumina," *J.Amer. Water Works Assoc.*, vol. 58, pp. 239–247 (1966).

* cited by examiner

ABSORBENT AND/OR CATALYST AND BINDER SYSTEM AND METHOD OF MAKING AND USING THEREFOR

CROSS-REFERENCE TO RELATED APPLICATIONS

This application is a divisional of, and claims the benefit of, application Ser. No. 08/734,330, filed Oct. 21, 1996, now U.S. Pat. No. 5,948,726, which application is hereby incorporated herein by this reference, which 1) a continuation-in-part of PCT/US96/05303, filed Apr. 17, 1996, which is a continuation-in-part of U.S. application Ser. No. 08/426,98, filed Apr. 21, 1995, now abandoned; (2) a continuation-in-part of U.S. application Ser. No. 08/426,981, filed Apr. 21, 1995, now abandoned; (3) a continuation-in-part of U.S. application Ser. No. 08/662,331, filed Jun. 12, 1996, now abandoned, which is a continuation-in-part of PCT/US95/15829, filed Jun. 12, 1995, now abandoned, which is a continuation-in-part of U.S. application Ser. No. 08/351,600, filed Dec. 7, 1994, abandoned; and (4) a continuation-in-part of PCT/US95/15829, filed Jun. 12, 1995, which is a continuation-in-part of U.S. application Ser. No. 08/351,600, filed Dec. 7, 1994, abandoned. All of the above applications are hereby incorporated by this reference in their entireties for all of their teachings.

BACKGROUND OF THE INVENTION

1. Field of the Invention

This invention relates generally to an adsorbent and/or catalyst particle that has improved adsorbent properties and/or improved or newly existing catalytic properties by the use of the particle in combination with a particular binder to produce a particle/binder system. The binder can either cross-link to the particle, cross-link to itself and envelope the particle or both.

2. Background Art

Oxides of metals and certain non-metals are known to be useful for removing constituents from a gas or liquid stream by adsorbent mechanisms. For example, the use of activated alumina is considered to be an economical method for treating water for the removal of a variety of pollutants, gasses, and some liquids. Its highly porous structure allows for preferential adsorptive capacity for moisture and contaminants contained in gasses and some liquids. It is useful as a desiccant for gasses and vapors in the petroleum industry, and has also been used as a catalyst or catalyst-carrier in chromatography and in water purification. Removal of contaminants such as phosphates by activated alumina are known in the art. See, for example, Yee, W., "Selective Removal of Mixed Phosphates by Activated Alumina," *J.Amer. Waterworks Assoc.*, Vol. 58, pp. 239–247 (1966).

U.S. Pat. No. 5,366,948 to Absil et al. discloses the preparation of a fluid cracking catalyst. The catalyst was prepared by the addition of phosphoric acid to a zeolite slurry. A second slurry was prepared by mixing colloidal silica with a source of alumina which is acid soluble. This slurry was mixed with a clay, then the zeolite slurry was added. The final slurry was spray dried at an outlet temperature of 350–360° F. and a pH of 2.8, then calcined in air at approximately 1000° F. The cracking catalyst was used to produce high octane gasoline, and increased lower olefins, especially propylene and butylene.

U.S. Pat. No. 5,422,323 to Banerjee et al. discloses the preparation of a pumpable refractory insulator composition. The composition consists of the combination of a wet component of colloidal silica (40%) in water, and a dry component consisting of standard refractory material. Examples of refractory material include clay, kaolinite, mullite, alumina and alumina silicates. The resulting insulating composition was cast into shape, dried and baked to form an insulating layer.

Japanese Patent No. 63264125 to Fumikazu et al. discloses the preparation of dry dehumidifying materials. Moisture is removed from room air or gas as it passes through a dehumidifying rotor of zeolite (70% by weight) and an inorganic binder (2–30% by weight). The inorganic binder includes colloidal silica, colloidal alumina, silicates, aluminates and bentonite. Wet air was passed through the dehumidifying rotor, and the amount of dried air was assessed.

Japanese Patent No. 60141680 to Kanbe et al. discloses the preparation of a refractory lining repair material. The material was prepared by adding a solution of phosphoric acid with ultra fine silica powder to a mixture of refractory clay and refractory aggregates composed of grog, alumina, silica, zircon and pyrophyllite. The refractory material has improved bonding strength and minute structure, and are useful for molten metal vessels such as ladles, tundishes, and electric furnaces.

Adsorbent particles of the prior art have not achieved the ability to remove particular contaminants from a liquid or gas stream, such as, for example, a waste stream or drinking water, to acceptably low levels. Additionally, the adsorbent particles of the prior art have not been able to bind tightly to particular contaminants so that the adsorbent particle/contaminant composition can be safely disposed of in a landfill. Thus, there has been a need in the art for adsorbents that have improved ability to adsorb particular materials, particularly contaminants from a gas or liquid stream, to thereby purify the stream. There has been a need in the art for the adsorbent particles to tightly bind to the adsorbed contaminant. Also, there has been a need in the art for catalysts that have the ability or that have an improved ability to catalyze the reaction of contaminants into non-contaminant by-products.

Typically in the art, binders block active sites on the adsorbent and catalyst particles, thereby reducing the efficiency of such particles. Therefore, there is a need in the art for a binder system that binds adsorbent and/or catalytic particles together without reducing the performance of the particles.

Applicants have discovered that by using a special binder for adsorbent and/or catalytic particles, improved or new adsorbent and/or catalytic properties can be achieved.

None of the above-cited documents discloses the compositions or processes such as those described and claimed herein.

SUMMARY OF THE INVENTION

In accordance with the purpose(s) of this invention, as embodied and broadly described herein, this invention, in one aspect, relates to a method for producing an adsorbent and/or catalyst and binder system comprising
i) mixing components comprising
   a) a binder comprising a colloidal metal oxide or colloidal metalloid oxide,
   b) an oxide adsorbent and/or catalyst particle, and
   c) an acid,
ii) removing a sufficient amount of water from the mixture to cross-link components a and b to form an adsorbent and/or catalyst and binder system.

In another aspect, the invention provides for an adsorbent and/or catalyst system made by the processes of the invention.

In one aspect, the invention provides an adsorbent and/or catalyst and binder system comprising a binder that has been cross-linked with at least one type of oxide adsorbent and/or catalyst particle.

In yet another aspect, the invention provides a method for reducing or eliminating the amount of a contaminant from a liquid or gas stream comprising contacting the adsorbent and/or catalyst binder system with the contaminant in the stream for a sufficient time to reduce or eliminate the amount of contaminant from the stream.

In yet another aspect, the invention provides a method for catalyzing the degradation of an organic compound comprising contacting the organic compound with the adsorbent and/or catalyst system for a sufficient time to catalyze the degradation of an organic compound.

In yet another aspect, the invention provides a method for reducing or eliminating the amount of a contaminant from a gas stream by catalysis comprising contacting the adsorbent and/or catalyst binder system with a gas stream containing a contaminant comprising an oxide of nitrogen, an oxide of sulfur, carbon monoxide, hydrogen sulfide, or mixtures thereof for a sufficient time to reduce or eliminate the contaminant amount.

In yet another aspect, the invention provides a method for producing an adsorbent and/or catalyst and binder system comprising i) mixing components comprising
   a) a binder comprising a colloidal metal oxide or colloidal metalloid oxide,
   b) a first adsorbent and/or catalyst particle that does not cross-link with the binder, and
   c) an acid,
ii) removing a sufficient amount of water from the mixture to cross-link component a to itself, thereby entrapping and holding component b within the cross-linked binder, to form an adsorbent and/or catalyst and binder system.

In another aspect the invention relates to a composition for binding adsorbent and/or catalytic particles to produce an agglomerated particle comprising (a) a colloidal metal oxide or colloidal metalloid oxide and (b) an acid.

In another aspect the invention relates to a kit for binding adsorbent and/or catalytic particles to produce an agglomerated particle comprising (a) a colloidal metal oxide or colloidal metalloid oxide and (b) an acid.

In yet another aspect, the invention provides a method for binding adsorbent and/or catalytic particles, comprising the steps of:

(a) mixing colloidal alumina or colloidal silica with the particles and an acid;
(b) agitating the mixture to homogeneity; and
(c) heating the mixture for a sufficient time to cause cross-linking of the aluminum oxide in the mixture.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE PREFERRED EMBODIMENTS

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

The term "particle" as used herein is used interchangeably throughout to mean a particle in the singular sense or a combination of smaller particles that are grouped together into a larger particle, such as an agglomeration of particles.

The term "ppm" refers to parts per million and the term "ppb" refers to parts per billion.

The term "and/or" in "adsorbent and/or catalyst" refers to a particle that either acts as a catalyst, or can act as both an adsorbent or catalyst under different circumstances due to, for example, the positive composition and the type of contaminant.

This invention, in one aspect, relates to a method for producing an adsorbent and/or catalyst and binder system comprising i) mixing components comprising
   a) a binder comprising a colloidal metal oxide or colloidal metalloid oxide,
   b) an oxide adsorbent and/or catalyst particle, and
   c) an acid,
ii) removing a sufficient amount of water from the mixture to cross-link components a and b to form an adsorbent and/or catalyst and binder system.

In another aspect, the invention provides for an adsorbent and/or catalyst system made by the processes of the invention.

In one aspect, the invention provides an adsorbent and/or catalyst and binder system comprising a binder that has been cross-linked with at least one type of oxide adsorbent and/or catalyst particle.

In yet another aspect, the invention provides a method for reducing or eliminating the amount of a contaminant from a liquid or gas stream comprising contacting the adsorbent and/or catalyst binder system with the contaminant in the stream for a sufficient time to reduce or eliminate the amount of contaminant from the stream.

In yet another aspect, the invention provides a method for catalyzing the degradation of an organic compound comprising contacting the organic compound with the adsorbent and/or catalyst system for a sufficient time to catalyze the degradation of an organic compound.

In yet another aspect, the invention provides a method for reducing or eliminating the amount of a contaminant from a gas stream by catalysis comprising contacting the adsorbent and/or catalyst binder system with a gas stream containing a contaminant comprising an oxide of nitrogen, an oxide of sulfur, carbon monoxide, hydrogen sulfide, or mixtures thereof for a sufficient time to reduce or eliminate the contaminant amount.

In yet another aspect, the invention provides a method for producing an adsorbent and/or catalyst and binder system comprising
  i) mixing components comprising
    a) a binder comprising a colloidal metal oxide or colloidal metalloid oxide,
    b) a first adsorbent and/or catalyst particle that does not cross-link with the binder, and
    c) an acid,
  ii) removing a sufficient amount of water from the mixture to cross-link component a to itself, thereby entrapping and holding component b within the cross-linked binder, to form an adsorbent and/or catalyst and binder system.

In another aspect the invention relates to a composition for binding adsorbent and/or catalytic particles to produce an agglomerated particle comprising (a) a colloidal metal oxide or colloidal metalloid oxide and (b) an acid.

In another aspect the invention relates to a kit for binding adsorbent and/or catalytic particles to produce an agglomerated particle comprising (a) a colloidal metal oxide or colloidal metalloid oxide and (b) an acid.

In yet another aspect, the invention provides a method for binding adsorbent and/or catalytic particles, comprising the steps of:
  (a) mixing colloidal alumina or colloidal silica with the particles and an acid;
  (b) agitating the mixture to homogeneity; and
  (c) heating the mixture for a sufficient time to cause cross-linking of the aluminum oxide in the mixture.

When the system acts as an adsorbent, the adsorbent and binder system of this invention has improved or enhanced adsorptive features. In one embodiment, the system of this invention can adsorb a larger amount of adsorbate per unit volume or weight of adsorbent particles than a prior art system. In another embodiment, the adsorbent and binder system of this invention can reduce the concentration of contaminants or adsorbate material in a stream to a lower absolute value than is possible with a non-bound or prior art-bound particle. In particular embodiments, the adsorbent and binder system of this invention can reduce the contaminant concentration in a stream to below detectable levels. Adsorption is a term well known in the art and should be distinguished from absorption. The adsorbent particles of this invention chemically bond to and very tightly retain the adsorbate material. These chemical bonds are ionic and/or covalent in nature.

The catalyst and binder system of the invention can also be used for the catalytic decomposition or remediation of contaminants. The catalyst system achieves improved catalytic performance or catalytic properties never seen before for a particular contaminant. The adsorbent and/or catalyst and binder system can be prepared by techniques set forth below to form a multifunctional composite particle. The catalysis can be at room temperature for certain applications.

The binder comprises an oxide particle that can react, preferably cross-link, with the other oxide complexes. This binder can also react, preferably cross-link, with itself. The binder forms cross-links with other oxide complexes upon drying by forming chemical bonds with itself and with other oxides. Under acidic conditions, the binder has a large number of surface hydroxyl groups. In one embodiment, the binder, which is designated as B—OH, cross-links with itself upon the loss of water to generate B—O—B. In addition cross-linking with itself, the binder B—OH can also cross-link with an adsorbent and/or catalyst oxide complex (M—O) or hydroxyl complex (M—OH) to produce B—O—M. The resulting binder system consists of a three dimensional network or matrix wherein the component particles are bound together with B—O—B and B—O—M bonds. The resulting system can be used as an adsorbent and/or catalyst system. The resultant system is sometimes referred to as an agglomerated particle.

"Colloidal metal or metalloid oxide (i.e. colloidal metal oxide or colloidal metalloid oxide) binder" as defined herein means a particle comprising a metal or metalloid mixed hydroxide, hydroxide oxide or oxide particle, such that the weight loss from the colloidal metal or metalloid oxide binder due to loss of water upon ignition is from 1 to 100%, 5 to 99%, 10 to 98%, or 50 to 95% of the theoretical water weight loss on going from the pure metal or metalloid hydroxide to the corresponding pure metal or metalloid oxide. The loss of water on going from the pure metal or metalloid hydroxide to the corresponding pure metal or metalloid oxide (e.g. the conversion of n $M(OH)_x$ to $M_nO_m$ and y $H_2O$ or more specifically from 2 $Al(OH)_3$ to $Al_2O_3$ and 3 $H_2O$) is defined as 100% of the water weight loss. Thus, the weight loss refers to loss of water based on the initial weight of water (not the total initial binder weight). There is a continuum of metal or metalloid hydroxides, hydroxide oxides, and oxides in a typical commercial product, such that, loss or removal of water from the metal or metalloid hydroxides produces the corresponding hydroxide oxides which upon further loss or removal of water give the corresponding metal or metalloid oxides. Through this continuum the loss or removal of water produces M—O—M bonds, where M is a metal or metalloid. The particles of this continuum, except for the pure metal or metalloid oxides, are suitable to serve as colloidal metal or colloidal oxide binders in this invention.

In another embodiment, the binder system involves the use of a binder in combination with a particle with few or no surface hydroxyl groups, such that the particle does not cross-link or only nominally cross-links with the binder. Examples of particles that posses only nominal amounts or that do not posses surface hydroxyl groups include particles of metals, such as, but not limited to tin or zinc, or carbon. In another embodiment, component b does not contain an oxide particle. Metal alloys such as bronze can also be used. In a preferred embodiment, the particle is activated carbon. In this embodiment, the binder cross-links with itself in a manner described above to form a three dimensional network or matrix that physically entraps or holds component b without cross-linking or cross-linking only to a very small degree with component b. The resulting binder system can be used as an adsorbent and/or catalyst system.

In another embodiment, the invention is directed to a method for producing an adsorbent and/or catalyst and binder system comprising
  i) mixing components comprising
    a) a binder comprising a colloidal metal oxide or colloidal metalloid oxide,
    b) a first adsorbent and/or catalyst particle that does not cross-link with the binder, and
    c) an acid,
  ii) removing a sufficient amount of water from the mixture to cross-link component a to itself, thereby entrapping and holding component b within the cross-linked binder, to form an adsorbent and/or catalyst and binder system,
further comprising a second adsorbent and/or catalyst particle that cross-links with the binder, thereby cross-linking the binder and the second particle and thereby entrapping and holding the first particle within the cross-linked binder and/or within the cross-linked binder and second particle. In this embodiment, the system comprises a binder and oxide adsorbent and/or catalyst particles that cross-links with the binder as well as particles that have a limited amount of surface hydroxyl groups, which do not cross-link with the binder. In this case, the binder cross links to itself and to the oxide complex particles, and the binder also forms a network or matrix around the particles that have a limited number of surface hydroxyl groups.

Binders that can be used in the present invention are colloidal metal or metalloid oxide complexes. Colloidal as used herein is defined as an oxide group that has a substantial number of hydroxyl groups that can form a dispersion in aqueous media. This is to be distinguished from the other use of the term colloid as used in regard to a size of less than 1 $\mu$m. The binders herein are typically small in size, e.g. less than 150 $\mu$m, but they do not have to be all less than 1 $\mu$m. Typically, the binder is un-calcined to maximize the hydroxyl group availability. Moreover, they must have a substantial number of hydroxyl groups that can form a dispersion in aqueous media, which is not always true of colloid particles merely defined as being less than 1 $\mu$m. Examples of binders include but are not limited to any metal or metalloid oxide complex that has a substantial number of hydroxyl groups that can form a dispersion in aqueous media. In one embodiment, the binder is colloidal alumina, colloidal silica, colloidal metal oxide where the metal is iron, or a mixture thereof, preferably colloidal alumina or colloidal silica. Colloidal alumina can be a powder, sol, gel or aqueous dispersion. Colloidal alumina may be further stabilized with an acid, preferably nitric acid, and even more preferably 3 to 4% nitric acid. In a preferred embodiment, the colloidal alumina is un-calcined with a sufficient number of hydroxyl groups such that the total particle weight loss (as distinguished from just water weight loss discussed above) upon ignition is between from 5% to 34%, more preferably from 20% to 31%. The colloidal alumina size is preferably from 5 nm to 400 $\mu$m, preferably at least 30 wt % is less than 25 $\mu$m and 95 wt % is less than 100 $\mu$m. The colloidal silica is preferably un-calcined with a sufficient number of hydroxyl groups such that the total particle weight loss upon ignition is between from 5% to 37%, more preferably from 20% to 31%. The colloidal silica size is preferably from 5 nm to 250 $\mu$m, preferably at least 30 wt % is less than 25 $\mu$m and 95 wt % is less than 100 $\mu$m. In one embodiment, the binder is from 1% to 99.9% by weight of the mixture, preferably from 10% to 35% by weight. As used herein, the binder will be referred to as "colloidal" to distinguish it from particle b, as the composition types can be the same, e.g. both can contain aluminum oxides.

Although prior art binders can be used in combination with the binder system of the present invention, these prior art binders lack certain advantages. In the present invention, the activity is not degraded when exposed to aqueous solutions. The system is also very durable and not subject to falling apart when exposed to a waste stream, unlike other prior art adsorbent and/or catalyst and binder systems, such as polyvinyl pyrolidone, starch, or cellulose.

The invention contemplates the use of any prior art oxide adsorbent and/or catalyst particle or composite particle of two or more types of particles and binder system, but replacing the prior art binder with the binder of the present invention. In one aspect, the invention provides an adsorbent and/or catalyst and binder system comprising a binder that has been cross-linked with at least one type of oxide adsorbent and/or catalyst particles. In one embodiment, component b comprises at least two different types of oxide adsorbent and/or catalyst particles, to form a cross-linking between the binder and both particles to thereby form a composite particle.. In another embodiment, component b comprises at least three different types of adsorbent and/or catalyst particles. In a preferred embodiment, component b comprises an oxide particle, preferably a metal oxide particle, and even more preferably a non-ceramic, porous metal oxide particle. Examples of such particles include, but are not limited to, oxide complexes, such as transition metal oxides, lanthanide oxides, thorium oxide, as well as oxides of Group IIA (Mg, Ca, Sr, Ba), Group IIIA (B, Al, Ga, In, Tl), Group IVA (Si,Ge, Sn, Pb), and Group VA (As, Sb, Bi). In general, any oxide complex that is a basic anhydride is suitable for component b. In another embodiment, component b comprises an oxide of aluminum, titanium, copper, vanadium, silicon, manganese, iron, zinc, zirconium, tungsten, rhenium, arsenic, magnesium, thorium, silver, cadmium, tin, lead, antimony, ruthenium, osmium, cobalt or nickel or zeolite. Typically, any oxidation state of the oxide complexes may be useful for the present invention. The oxide can be a mixture of at least two metal oxide particles having the same metal with varying stoichiometry and oxidation states. In one embodiment, component b comprises $Al_2O_3$, $TiO_2$, $CuO$, $Cu_2O$, $V_2O_5$, $SiO_2$, $MnO_2$, $Mn_2O_3$, $Mn_3O_4$, $ZnO$, $WO_2$, $WO_3$, $Re_2O_3$, $As_2O_3$, $As_2O_5$, $MgO$, $ThO_2$, $Ag_2O$, $AgO$, $CdO$, $SnO_2$, $PbO$, $FeO$, $Fe_2O_3$, $Fe_3O_4$, $Ru_2O_3$, $RuO$, $OSO_4$, $Sb_2O_3$, $CoO$, $Co_2O_3$, $NiO$ or zeolite. In a further embodiment, component b further comprises a second type of adsorbent and/or catalyst particles of an oxide of aluminum, titanium, copper, vanadium, silicon, manganese, iron, zinc, zirconium, tungsten, rhenium, arsenic, magnesium, thorium, silver, cadmium, tin, lead, antimony, ruthenium, osmium, cobalt or nickel or zeolite, activated carbon, including coal and coconut carbon, peat, zinc or tin. In another embodiment, component b further comprises a second type of adsorbent and/or catalyst particles of aluminum oxide, titanium dioxide, copper oxide, vanadium pentoxide, silicon dioxide, manganese dioxide, iron oxide, zinc oxide, zeolite, activated carbon, peat, zinc or tin particle. Typical zeolites used in the present invention include "Y" type, "beta" type, mordenite, and ZsM5. In a preferred embodiment, component b comprises non-amorphous, non-ceramic, crystalline, porous, calcined aluminum oxide that was produced by calcining the precursor to the calcined aluminum oxide at a particle temperature of from 400° C. to 700° C., preferably in the gamma, chi-rho, or eta form. The precursor to calcined aluminum oxide can include but is not limited to boehmite, bauxite, pseudo-boehmite, scale, $Al(OH)_3$ and alumina hydrates. In the case of other metal oxide complexes, these complexes can also be calcined or uncalcined.

The adsorbent and/or catalyst particles used in this invention can be unenhanced or enhanced by processes known in the art or described below. For example, the particles can be dried to be activated or can be of a composition or treated by ion or electron beam or acid activation or enhancement treatment processes disclosed in the prior filed parent applications of and in applicants' two copending applications filed on the same date as this application and entitled (1) "Enhanced Adsorbent and Room Temperature Catalyst Particle and Method of Making and Using Therefor," which is a continuation-in-part of PCT/US96/05303, filed Apr. 17, 1996, pending, which is a continuation-in-part of U.S. application Ser. No. 08/426,981, filed Apr. 21, 1995, pending, and (2) "Acid Contacted Enhanced Adsorbent Particle and Method of Making and Using Therefor," which is a continuation-in-part of U.S. application Ser. No. 08/662,331, filed Jun. 12, 1996, pending, which is a continuation-in-part of PCT/US95/15829, filed Jun. 12, 1995, pending, which is a continuation-in-part of U.S. application Ser. No. 08/351,600, filed Dec. 7, 1994, abandoned, the disclosures of both applications filed on the same date as this application and all of their prior filed priority applications are herein incorporated by this reference in their entireties for all of their teachings, indirectly, but not limited to particle compositions and methods of treatment.

An acid is required to cross-link the binder with component b. The addition of an acid to the binder facilitates or enables the reaction between the binder and the oxide particle. A strong or dilute acid can be used. A dilute acid is preferred to minimize etching of certain particles. Typically the acid is diluted with water to prevent dissolution of the particle and for cost effectiveness. The acid treatment is preferably of a concentration (i.e. acid strength as measured by, e.g., normality or pH), acid type, temperature and length of time to cross-link the binder and component b.

In one embodiment, the acid comprises nitric acid, sulfuric acid, hydrochloric acid, boric acid, acetic acid, formic acid, phosphoric acid or mixtures thereof, preferably acetic acid or nitric acid. In another embodiment, the concentration of the acid is from 0.15 N to 8.5 N, preferably from 0.5 N to 1.7 N. The volume of dilute acid used must be high enough so that the adsorbent and/or catalyst particle of the present invention can be used as is or further processed, such as extruded or filter pressed.

In order to ensure efficient cross-linking between the binder and the oxide particle component, water is removed from the resulting binder system. This is typically performed by using a drying agent or heating the system. The cross-linking temperature as used herein is the temperature at which cross-linking between the binder and the oxide adsorbent and/or catalyst component b occurs at an acceptable rate or the temperature at which the binder reacts with itself at an acceptable rate. In one embodiment, the cross-linking temperature is from 25° C. to 400° C. Thus, in one embodiment, the cross-linking temperature for certain binders is at room temperature although the rate of cross-linking at this temperature is slow. In a various embodiments, the cross-linking temperature is from 50° C., 70° C., 110° C., or 150° C. to 200° C., 250° C., 300° C., or 150° C., preferably 150° C. to 300° C., even more preferably about 250° C. The cross-linking process can take place in open air, under an inert atmosphere or under reduced pressure. The cross-linking temperature can effect the activity of the adsorbent and/or catalyst and binder system. When cross-linking occurs in the open air, then the particle is more susceptible to oxidation as the cross-linking temperature is increased. Oxidation of the particle can ultimately reduce the activity of the particle.

Preferably, during or after step (i), the mixture of step (i) is not heated above the cross-linking temperature of the colloidal metal oxide or colloidal metalloid oxide. Preferably, during or after step (i), the mixture of step (i) is not heated to or above the calcining temperature of the colloidal metal oxide or colloidal metalloid oxide. Preferably, during or after step (i), the mixture of step (i) is not heated to or above the calcining temperature of the particle. In various embodiments, during or after step (i), the mixture of step (i) is not heated above 500° C., 450° C., 400° C., 350° C., 300° C., or 250° C., preferably not above 400° C. Cross-linking should be distinguished from calcining. Calcining typically involves heating a particle to remove any residual water that may be on the particle as well as change the lattice structure of the particle to form a crystalline particle. For example for producing a crystalline aluminum oxide particle, the calcining temperature is about 400° C. to about 700° C. Calcining also removes the hydroxyl groups on the binder that are required for cross-linking. Therefore, heating the system during or after step (i) above the cross-linking temperature into the particle or binder calcining temperature range or above is detrimental to the system. Thus, prior art systems, where mixtures of colloidal alumina and/or colloidal silica are (1) calcined or recalcined or (2) heated to form a refractory material are not a part of this invention.

In another aspect, the invention provides for an adsorbent and/or catalyst system made by the process of the invention.

The binder system of the invention is made in one embodiment by the following general process. The (1) binder and (2) adsorbent and/or catalyst particles are pre-mixed in dry form. The colloidal binder can be added or prepared in situ. For example, alum could be added as a dry powder and converted to colloidal alumina in situe. Other aluminum based compounds can be used for the in situ process, such as aluminum chloride, aluminum secondary butoxide, and the like. A solution of the acid is added to the mixture, and the mixture is stirred or agitated, typically from 1 minute to 2 hours, preferably from 10 minutes to 40 minutes, until the material has a homogeneous "clay" like texture. The mixture is then ready for cross-linking or can be first fed through an extruder and then cut or chopped into a final shape, preferably spheres, pellets or saddles, typically of a size from 0.2 mm to 3 mm, preferably 0.5 to 1.5 mm. After the final shape is made, the product is transferred to a drying oven where they are dried from 15 minutes to 4 hours, preferably from 30 minutes to 2 hours. Once the binder is added to the adsorbent and/or catalyst particles (component b), the mixture is not heated to calcine or recalcine the particle b or binder. Such calcining or recalcining would detrimentally change the surface characteristics of component b by closing up the micropores. Additionally, the particles of the invention are preferably not sintered, as this would detrimentally affect the micropores by closing up the micropores and would detrimentally decrease the pore volume and surface area. The particles and binder system are also not heated above the calcining temperature to form a refractory material. Any other process that would increase the size or eliminate micropores, enlarge the size of, create macropores at the expense of micropores or destroy macropores, or would decrease the surface area available for adsorption or catalysis should preferably be avoided.

The size and shape of the particles used in this invention prior to extruding can vary greatly depending on the end use. Typically, for adsorption or catalytic applications, a small particle size such as 5 $\mu$m or greater to about 250 $\mu$m are preferable because they provide a larger surface area than large particles.

In yet another aspect, the invention provides a method for reducing or eliminating the amount of a contaminant from a liquid or gas stream comprising contacting the adsorbent and/or catalyst binder system with the contaminant in the stream for a sufficient time to reduce or eliminate the amount of contaminant from the stream. In one embodiment, the stream is a liquid, preferably water. In another embodiment, the stream is a gas, preferably comprising air or natural gas.

The adsorbent and/or catalyst binder system of this invention can be used for environmental remediation applications. In this embodiment, contaminants from a liquid or gas stream can be reduced or eliminated by a catalysis reaction.

In another embodiment, contaminants from a liquid or gas stream can be reduced or eliminated by an adsorption reaction. The particle can be used to remove contaminants, such as, but not limited to, heavy metals, organics, including hydrocarbons, chlorinated organics, including chlorinated hydrocarbons, inorganics, or mixtures thereof. Specific examples of contaminants include, but are not limited to, acetone, ammonia, benzene, carbon monoxide, chlorine, hydrogen sulfide, trichloroethylene, 1,4-dioxane, ethanol, ethylene, formaldehyde, hydrogen cyanide, hydrogen sulfide, methanol, methyl ethyl ketone, methylene chloride, oxides of nitrogen such as nitrogen oxide, propylene, styrene, oxides of sulfur such as sulfur dioxide, toluene, vinyl chloride, arsenic, cadmium, chlorine, 1,2-dibromochloropropane (DBCP), iron, lead, phosphate, radon, selenium, or uranium. The adsorbent and/or catalyst binder system of this invention can remediate individual contaminants or multiple contaminants from a single source. This invention achieves improved efficiency by adsorbing a higher amount of contaminants and by reducing the contamination level to a much lower value than by non-enhanced particles.

In yet another aspect, the invention provides a method for catalyzing the degradation of an organic compound comprising contacting the organic compound with the adsorbent and/or catalyst system for a sufficient time to catalyze the degradation of an organic compound. In one embodiment, the catalysis reaction is at room temperature. In a one embodiment, the organic compound is a chlorinated organic compound, such as trichloroethylene (TCE). In one embodiment, the catalyst and binder system catalyzes the hydrolysis of the chlorinated organic compounds.

In yet another aspect, the invention provides a method for reducing or eliminating the amount of a contaminant from a gas stream by catalysis comprising contacting the adsorbent and/or catalyst binder system with a gas stream containing a contaminant comprising an oxide of nitrogen, an oxide of sulfur, carbon monoxide, hydrogen sulfide, or mixtures thereof for a sufficient time to reduce or eliminate the contaminant amount. In one embodiment, the catalysis reaction is at room temperature.

For environmental remediation applications, adsorbent and/or catalyst particles of the invention are typically placed in a container, such as a filtration unit. The contaminated stream enters the container at one end, contacts the particles within the container, and the purified stream exits through another end of the container. The particles contact the contaminants within the stream and bond to and remove the contamination from the stream. Typically, the particles become saturated with contaminants over a period of time, and the particles must be removed from the container and replaced with fresh particles. The contaminant stream can be a gas stream or liquid stream, such as an aqueous stream. The particles can be used to remediate, for example, waste water, production facility effluent, smoke stack gas, auto exhaust, drinking water, and the like.

The particle/binder system of the invention can be used preferably as the adsorbent or catalytic medium itself. In an alternate embodiment, the system is used as an adsorbent or catalytic support.

When the particle adsorbs a contaminent, the particle of this invention bonds with the contaminant so that the particle and contaminant are tightly bound. This bonding makes it difficult to remove the contaminant from the particle, allowing the waste to be disposed of into any public landfill. Measurements of contaminants adsorbed on the particles of this invention using an EPA Toxicity Characteristic Leachability Procedure (TCLP) test known to those of skill in the art showed that there was a very strong interaction between the particles of this invention and the contaminants such that the contaminant is held very tightly.

Although the particle system bonds tightly to the contaminent, the system of the invention can be regenerated by various techniques, such as by roasting it in air to reoxidize the particles.

In one embodiment, component b comprises aluminum oxide, copper oxide, and manganese dioxide. In this embodiment, the binder is preferably colloidal alumina. In this embodiment, the acid is preferably acetic acid. In this embodiment, the binder is from 1 to 99.9 parts by weight, preferably from 5 to 35 parts by weight, the aluminum oxide is from 1 to 99.9 parts by weight, preferably from 55 to 85 parts by weight, the copper oxide is from 1 to 99.9 parts by weight, preferably from 1 to 20 parts by weight, and the manganese oxide is from 1 to 99.9 parts by weight, preferably from 1 to 20 parts by weight. In another embodiment, the binder is 20 parts by weight, aluminum oxide is 70 parts by weight, copper oxide is 5 parts by weight, and manganese dioxide is 5 parts by weight.

In another embodiment, component b comprises aluminum oxide and activated carbon. In this embodiment, the binder is preferably colloidal alumina. In this embodiment, the acid is preferably acetic acid. In this embodiment, the binder is from 1 to 99.9 parts by weight, preferably from 5 to 35 parts by weight, the aluminum oxide is from 1 to 99.9 parts by weight, preferably from 45 to 75 parts by weight, and the activated carbon is from 1 to 99.9 parts by weight, preferably from 35 to 55 parts by weight. In another embodiment, the binder is 20 parts by weight, aluminum oxide is 60 parts by weight, and activated carbon is 5 parts by weight.

In another embodiment, component b comprises copper oxide and manganese dioxide. In this embodiment, the binder is preferably colloidal alumina. In this embodiment, the acid is preferably acetic acid. In this embodiment, the binder is from 1 to 99.9 parts by weight, preferably from 5 to 35 parts by weight, the copper oxide is from 1 to 99.9 parts by weight, preferably from 35 to 55 parts by weight, and the manganese dioxide is from 1 to 99.9 parts by weight, preferably from 25 to 55 parts by weight. In another embodiment, the binder is 20 parts by weight, copper oxide is 40 parts by weight, and manganese dioxide is 40 parts by weight.

In another embodiment, component b comprises aluminum oxide, copper oxide, manganese dioxide and activated carbon. In this embodiment, the binder is preferably colloidal alumina. In this embodiment, the acid is preferably acetic acid. In this embodiment, the binder is from 1 to 99.9 parts by weight, preferably from 5 to 35 parts by weight, the aluminum oxide is from 1 to 99.9 parts by weight, preferably from 45 to 75 parts by weight, the copper oxide is from 1 to 99.9 parts by weight, preferably from 1 to 20 parts by weight, the manganese dioxide is from 1 to 99.9 parts by weight, preferably from 1 to 20 parts by weight, and activated carbon is from 1 to 99.9 parts by weight, preferably from 1 to 25 parts by weight. In another embodiment, the binder is 19.9 parts by weight, aluminum oxide is 60 parts by weight, copper oxide is 5.98 parts by weight, manganese dioxide is 4.98 parts by weight, and activated carbon is 9.95 parts by weight.

In another embodiment, the component b comprises aluminum oxide, silicon dioxide and activated carbon. In a further embodiment, the particle comprises 1–99 parts, preferably 5–35 parts, more preferably 20 parts by weight aluminum oxide, 1–99 parts, preferably 5–35 parts, more preferably 20 parts by weight silicon dioxide and 1–99 parts, preferably 25–55 parts, more preferably 40 parts by weight activated carbon. In this embodiment, the binder is preferably colloidal alumina and the acid is preferably acetic acid. The binder is from 1 to 99.9 parts by weight, preferably from 5 to 35 parts by weight In another embodiment, the catalyst and binder system can be used as an oxidation catalyst. In one embodiment, the system comprises colloidal alumina as a binder, $Al_2O_3$, and one or more of the following oxide particles of $V_2O_5$, $WO_2$, $WO_3$, $TiO_2$, $Re_2O_7$, $As_2O_3$, $As_2O_5$, $OSO_4$, or $Sb_2O_3$. In another embodiment, the colloidal alumina is from 10 to 30 parts by weight, $Al_2O_3$ is from 1 to 90 parts by weight, and $V_2O_5$, $WO_2$, $WO_3$, $TiO_2$, $Re_2O_7$, $AS_2O_3$, $AS_2O_5$, $OsO_4$, or $Sb_2O_3$ are each from 1 to 90 parts by weight.

In another embodiment, the catalyst and binder system can be used as a Lewis acid catalyst. In one embodiment, the system comprises colloidal alumina as a binder, $Al_2O_3$, and one or more of the following oxide particles of $V_2O_5$, $ZrO_2$, $TiO_2$, $MgO$, $ThO_2$ or lanthanide oxides. In another embodiment, the colloidal alumina is from 10 to 30 parts by weight, $Al_2O_3$ is from 1 to 90 parts by weight, and $V_2O_5$, $ZrO_2$, $TiO_2$, $MgO$, $ThO_2$ or lanthanide oxides are each from 1 to 90 parts by weight.

In another embodiment, the catalyst and binder system can be used as a cracking catalyst. In one embodiment, the system comprises colloidal alumina as a binder, $Al_2O_3$, and one or more of the following oxide particles of $CuO$, $ZnO$, $Ag_2O$, $AgO$, $CdO$, $SnO_2$, $PbO$, $V_2O_5$, $ZrO_2$, $MgO$, $ThO_2$ or lanthanide oxides. In another embodiment, the colloidal alumina is from 10 to 30 parts by weight, $Al_2O_3$ is from 1 to 90 parts by weight, and $CuO$, $ZnO$, $Ag_2O$, $AgO$, $CdO$, $SnO_2$, $PbO$, $V_2O_5$, $ZrO_2$, $MgO$, $ThO_2$ or lanthanide oxides are each from 1 to 90 parts by weight.

In another embodiment, the catalyst and binder system can be used as a reduction catalyst. In one embodiment, the system comprises colloidal alumina as a binder, $Al_2O_3$, and one or more of the following oxide particles of $MnO_2$, $Fe_2O_3$, $Fe_3O_4$, $RU_2O_3$, $OsO_4$, $CoO$, $Co_2O_3$, $RuO$ or $NiO$. In another embodiment, the colloidal alumina is from 10 to 30 parts by weight, $Al_2O_3$ is from 1 to 90 parts by weight, and $MnO_2$, $Fe_2O_3$, $Fe_3O_4$, $RU_2O_3$, $OsO_4$, $CoO$, $Co_2O_3$, $RuO$ or $NiO$ are each from 1 to 90 parts by weight.

In another embodiment, the catalyst and binder system can be used as a coal gasification catalyst. In one embodiment, the system comprises colloidal alumina as a binder, $Al_2O_3$, and one or more of the following oxide particles of $Fe_2O_3$, $Fe_3O_4$, $CoO$ or $Co_2O_3$. In another embodiment, the colloidal alumina is from 10 to 30 parts by weight, $Al_2O_3$ is from 1 to 90 parts by weight, and $Fe_2O_3$, $Fe_3O_4$, $CoO$, or $Co_2O_3$, are each from 1 to 90 parts by weight.

In another embodiment, the catalyst and binder system can be used as a coal gas reforming catalyst. In one embodiment, the system comprises colloidal alumina as a binder, $Al_2O_3$, and one or more of the following oxide particles of $Fe_2O_3$, $Fe_3O_4$, $CoO$ or $Co_2O_3$. In another embodiment, the colloidal alumina is from 10 to 30 parts by weight, $Al_2O_3$ is from 1 to 90 parts by weight, and $Fe_2O_3$, $Fe_3O_4$, $CoO$, or $Co_2O_3$, are each from 1 to 90 parts by weight.

In another embodiment, the catalyst and binder system can be used as a hydrogenation catalyst. In one embodiment, the system comprises colloidal alumina as a binder, $Al_2O_3$, and one or more of the following oxide particles of $Fe_2O_3$, $Fe_3O_4$, $CoO$ or $Co_2O_3$. In another embodiment, the colloidal alumina is from 10 to 30 parts by weight, $Al_2O_3$ is from 1 to 90 parts by weight, and $Fe_2O_3$, $Fe_3O_4$, $CoO$ or $Co_2O_3$ are each from 1 to 90 parts by weight.

In another embodiment, the catalyst and binder system can be used as a desiccant. In one embodiment, the system comprises colloidal alumina as a binder, $Al_2O_3$, and one or more of the following oxide of zeolite, $MgO$, or $ThO_2$. In another embodiment, the colloidal alumina is from 10 to 30 parts by weight, $Al_2O_3$ is from 1 to 90 parts by weight, and zeolite, $MgO$, or $ThO_2$ are each from 1 to 90 parts by weight.

In another embodiment, the catalyst and binder system can be used as a catalyst support. In one embodiment, the system comprises colloidal alumina as a binder, $Al_2O_3$, and one or more of the following oxide particles of $MgO$ or $ThO_2$. In another embodiment, the colloidal alumina is from 10 to 30 parts by weight, $Al_2O_3$ is from 1 to 90 parts by weight, and $MgO$ or $ThO_2$ are each from 1 to 90 parts by weight.

In another embodiment, the invention relates to a composition for binding adsorbent and/or catalytic particles to produce an agglomerated particle comprising (a) a colloidal metal oxide or colloidal metalloid oxide and (b) an acid. In this composition, in one embodiment, the colloidal metal oxide or colloidal metalloid oxide comprises colloidal alumina or colloidal silica. In this composition, in one embodiment, the acid is acetic acid or nitric acid.

In another embodiment, the invention relates to a method for binding adsorbent and/or catalytic particles, comprising the steps of:

(a) mixing colloidal alumina or colloidal silica with the particles and an acid;

(b) agitating the mixture to homogeneity; and (c) heating the mixture for a sufficient time to cause cross-linking of the aluminum oxide in the mixture.

In one embodiment, the colloidal alumina or colloidal silica is colloidal alumina. In another embodiment, the colloidal alumina is from 20% to 99% by weight of the mixture. In another embodiment, the acid is nitric acid.

Experimental

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature and pressure is at or near atmospheric.

EXAMPLE 1

Various adsorbent and/or catalytic binder systems as set forth in Table 1 in Example 2 below were made in accordance with the general procedures of this invention as follows as well as various systems not a part of the invention.

The binder and adsorbent and/or catalytic particles were combined into a mixing vessel, the amount of each varied according to the size batch desired. However, the component ratios remained constant as indicated in Table 1 below. This "dry" combination was pre-mixed to ensure a homogenous mixture of all of the components. After this was accomplished, a solution containing 5% acetic acid in distilled water was added to the mixture. The amount of the acid compared to the other components varied depending on extruding parameters and other processing variables, but for the procedures herein the range was typically between 35 and 45 wt. % of the total mixture.

This solution was added to the dry materials and mixed until the material had a homogenous "modeling clay" like consistency. The mixing was performed utilizing a Hobart "A-300" mixer. The material was then ready for extrusion. The mixed product containing the acetic acid solution was fed through an extruder, such as a DGL-1 dome granulator manufactured by LCI Corporation of Charlotte, N.C., U.S.A. The extrudates were fed through a QJ-230 marumarizer, also manufactured by LCI Corporation, which turned the extrudates as "Rods" into small spheres. The extruding and marumarizing steps provided a finished product suitable to use for a specific application. However, the marumarizing is optional and does not alter the performance of the product. After the spheres were made, the product was transferred to a drying oven where it was dried for one (1) hour at a temperature of 250° Celsius. The product was then ready for use in an application.

EXAMPLE 2

The particles as formed of the constituents listed below in Table 1 were tested for their ability to remove TCE. Adsorbent and/or catalyst and binder systems of Table 1 were challenged with various concentrations of TCE as indicated in Table 1. Two custom made columns (40 cm ×20 mm) equipped with coarse glass frits were dried packed with 10 mL volumes (measured with a 10 mL graduated cylinder) of particles. The columns were challenged with five 10 mL aliquots (5 bed volumes) of the trichloroethylene (TCE) solution. The fifth bed volume from each column was collected in a 50 mL Erlenmeyer flask, stoppered, and immediately analyzed by purge and trap-GC/MS technique using a Finnigan MAT Magnum ion trap GC/MS equipped with a Tekmar liquid sample concentrator (LSC 2000).

The particles in Table 1 were prepared as described in Example 1. The percent composition of each component as well as the nature of the binder are presented in Table 1. Prior to mixing with the other components, the aluminum oxide particle was first calcined at 500° C. or 550° C. as indicated in Table 1, then acid treated by substantially contacting with 0.5% acetic acid at room temperature for 15 minutes as generally set forth in applicants' copending application filed on even date entitled "Acid Contacted Enhanced Adsorbent Particle and Method of making and Using Therefor" and as set forth in the parent applications to that application as listed above, and then dried at 121° C. for 90 minutes.

The removal of TCE from aqueous solution was investigated using a number of adsorbent and/or catalyst and binder systems of the present invention, and these results are summarized in Table 1. In Entry 8, 99% reduction of TCE was observed when the particle consisted of 40% CuO, 40% $MnO_2$, and 20% colloidal alumina as the binder. When no binder was used, however, the $CuO/MnO_2$ particle removed only 0–1% of TCE (Entries 9A 9B). These results indicate the necessity of the binder material to enhance or provide adsorbent and/or catalytic properties of or to the particle. Other particles demonstrated the ability to remove TCE. For example, entry 1 removed>95% of TCE. Entry 7 removed 99% of TCE. The particle of entry 7 had two adsorbent and/or catalyst particles, one of which was carbon. Carbon was also used in conjunction with multiple metal oxide components (Entry 24A and B) to remove TCE (>90%).

Although Entry 3 removed 96% of TCE, the PVP binder does not hold the particle together as long as the binders of the present invention. Particles with the PVP binder disintegrated over time, which reduced the usefulness of the particle. In the case of Entries 5A, SB and 6, TCE removal was very high (98%); however, the activated peat also breaks apart much faster than the particles of the present invention. The contaminents adsorbed by the peat may also leach into the environment.

Not wishing to be bound by theory, two plausible mechanisms can account for the catalytic degradation of TCE using the particles of the present invention. The first mechanism involves redox chemistry between TCE and the metal oxide components of the particle. TCE is electrophilic, and can stabilize a negative charge if reduced. Electron transfer from a metal oxide component to TCE may be the first step toward the degradation of TCE. A second mechanism involves a Lewis acid-base interaction between TCE and the metal oxide component, which increases the rate of nucleophilic attack of TCE by water. Due to the lone pair electrons on the chlorine groups of TCE, a metal oxide component can initially coordinate to the chlorine group. This initial coordination may also be the first step toward the catalytic degradation of TCE.

TABLE 1

| Entry | Binder (Wt %) | Drying/Cross-linking temperature ° C. (time min) | $Al_2O_3$ wt % (Calcining temperature, ° C.), Acid treated | CuO (Wt %) | $MnO_2$ (Wt %) | Other Component(s) (wt %) | TCE influent concentration Run A | TCE effluent concentration 5th bed volume (% reduction) Run A | TCE influent concentration Run B | TCE effluent concentration 5th bed volume (% reduction) Run B |
|---|---|---|---|---|---|---|---|---|---|---|
| 1 | V-900(20) | 150(15) | 70(550) | 5 | 5 | | 1.0 ppm | <50 ppb (>95%) | | |
| 2 | PVP(3.2) | 150(30) | 91.3(550) | 2.5 | 2.5 | MethylCellulose(0.5) | 50.0 ppm | 29.4 ppm(59) | 5.0 ppm | 0.5 ppm(90) |
| 3 | PVP(3.2) | 150(30) | 91.3(550) | 2.5 | 2.5 | MethylCellulose(0.5) | 5.0 ppb | 0.20 ppb(96) | | |
| 4 | | NA | | | | Zeolite(100) | rejected* | | | |
| 5 | | NA | | | | Acid treated Peat(100) | 50.0 ppm | 1.0 ppm(98) | 5.0 ppm | 0.1 ppb(98) |
| 6 | | NA | | | | Acid treated Peat(100) | 5.0 ppb | 0.07 ppb(98) | | |
| 7 | V-900(20) | 250(60) | 40(500) | | | WPH Carbon(40) | 5.0 ppb | 0.06 ppb(99) | | |
| 8 | V-900(20) | 250(60) | | 40 | 40 | | 5.0 ppb | 0.07 ppb(99) | | |
| 9 | | 250(60) | | 50 | 50 | | 50.0 ppb | 50.4 ppb(0) | 50.0 ppm | 49.6 ppm(1) |
| 10 | V-900(20) | 250(60) | 60(500) | 10 | 10 | | 50 ppm | 39.5 ppm(21) | 50.0 ppb | 39.9 ppm(20) |
| 11 | V-900(20) | 250(60) | 70(500) | 5 | 5 | | 50.0 ppm | 39.3 ppm(21) | 50.0 ppb | 45.8 ppm(8) |

TABLE 1-continued

| Entry | Binder (Wt %) | Drying/ Cross-linking temperature ° C. (time min) | $Al_2O_3$ wt % (Calcining temperature, ° C.), Acid treated | CuO (Wt %) | $MnO_2$ (Wt %) | Other Component(s) (wt %) | TCE influent concentration Run A | TCE effluent concentration 5th bed volume (% reduction) Run A | TCE influent concentration Run B | TCE effluent concentration 5th bed volume (% reduction) Run B |
|---|---|---|---|---|---|---|---|---|---|---|
| 12 | V-900(20) | 250(60) | | 10 | 10 | Zeolite(60) | 50.0 ppm | 37.2 ppm(26) | 50.0 ppb | 41.0 ppb(18) |
| 13 | | 250(60) | 100(550) | | | | 50.0 ppm | 21.2 ppm(58) | 50.0 ppb | 34.0 ppb(32) |
| 14 | V-900(20) PVP(3) | 250(60) | 67(550) | 5 | 5 | | rejected** | | | |
| 15 | V-900(20) PVP(3) | 250(60) | 71.6(550) | 2.5 | 2.5 | MethylCellulose(0.4) | rejected** | | | |
| 16 | V-900(17) | 250(60) | 13.6(550) | 1.7 | 1.7 | Tin(66) | rejected** | | | |
| 17 | V-900 (13.6) | 250(60) | 17(550) | 1.7 | 1.7 | Zinc(66) | rejected** | | | |
| 18 | V-900 (13.6) | 250(60) | 17(550) | 1.7 | 1.7 | | 50.0 ppm | 42.8 ppm(14) | 50.0 ppb | 44.4ppb(11) |
| 19 | V-900(20) | 250(60) | 17(550) | 1.7 | 1.7 | Tin(66) | 50.0 ppm | 36.3 ppm(27) | 50.0 ppb | 41.9 ppb(16) |
| 20 | V-900, (20) | 250(60) | 17(550) | 1.7 | 1.7 | Zinc(59.6) | 50.0 ppm | 27.8 ppm(44) | 50.0 ppb | 27.0 ppb(46) |
| 21 | V-900(20) | 250(60) | 70(550) | 5 | 5 | | 50.0 ppm | 24.8 ppm(50) | 50.0 ppb | 17.5 ppb(65) |
| 22 | V-900(20) | 550(60) | 70(550) | 5 | 5# | | 50.0 ppm | 42.7 ppm(15) | 50.0 ppb | 20.3 ppb(59) |
| 23 | | NA | | | | WPH Carbon(100) | rejected* | | | |
| 24 | V-900 (19.9) | 250(60) | 59.7(550) | 5.98 | 4.98 | WPH Carbon (9.95) Avicel Cellulose(0.5) | 50.0 ppm | <5.0 ppm (>90) | 50.0 ppb | 3.9 ppb(92) |
| 25 | Sol P2(20) | 250(60) | 70(550) | 5 | 5 | | 50.0 ppm | 5.8 ppm(88) | 50.0 ppb | 11.3 ppb(77) |

*sample did not allow water flow
**particle fell apart upon use
PVP = GAF PVP K-60 Polyvinylpyrrolidone
V-900 = LaRoche V-900 gel alumina (colloidal alumina)
Sol P2 = Condea Disperal Sol P2 (colloidal alumina)
Zeolite = Zeolyst international CBV 100
CuO = Fisher C472
$MnO_2$ = Kerr-McGee KM ® Electrolytic Manganese Dioxide 92% $MnO_2$ X-ray powder diffraction studies indicate this to be a mixture of manganese oxides.
Tin = Fisher T128
Zinc = Fisher Z16
MethylCellulose = Fisher M352
WHP Carbon = Calgon WPH powdered activate carbon
particle heated to 550° C. in air to convert $MnO_2$ to $Mn_3O_4$
NA = not applicable

EXAMPLE 3

Various adsorbent and/or catalyst and binder systems of Table 2 were prepared according to the procedures of Examples 1 and Example 2 (aluminum oxide preparation). Samples were tested to determine if they reacted with hydrogen sulfide at room temperature. Hydrogen sulfide was generated by treating sodium sulfide with sulfuric acid and vacuum transferred into an IR cell which had been loaded with 1.00 g of adsorbent and/or catalyst binder system to be tested. The IR cell used was 9 cm long by 4 cm in diameter (~120 mL volume). The cell was filled to approximately 170 torr $H_2S$ and observed visually and IR spectra recorded.

The percent composition of each component as well as the nature of the binder are presented in Table 2. The aluminum oxide particle was first calcined at 550°, then acid washed using 0.5% acetic acid and dried at 121° C. for 90 minutes using the same procedure described in Example 2. The cross-linking temperature for each particle was 250° C. for 1 hour.

The removal of hydrogen sulfide using the adsorbent and/or catalyst and binder systems of the present invention was investigated, and these results are summarized in Table 2. The removal of hydrogen sulfide by the adsorbent and/or catalyst binder systems was monitored by infrared spectroscopy. Based on these results, adsorbent and/or catalyst and binder systems of colloidal aluminum binder, acid treated aluminum oxide, and copper oxide provided the best results with regards to the removal of hydrogen sulfide.

TABLE 2

| Entry | Binder (Wt %) | $Al_2O_3$ wt % | ZnO wt % | CuO wt % | Length of Experiment to Remove $H_2S$ | $H_2S$ reacted | Comments |
|---|---|---|---|---|---|---|---|
| 1 | V-900(40) | 50 | 10 | | 16 h | Yes | Virtually all absorbed as determined IR |
| 2 | V-900(50) | 40 | 10 | | 24 h | Yes | Virtually all absorbed as determined IR |
| 3 | V-900(60) | 30 | 10 | | 42 h | Yes | Discoloration observed after 4 h Virtually all absorbed as determined IR |
| 4 | V-900(20) | 60 | 10 | 10 | 24 h | Yes | Virtually all absorbed as determined IR |

TABLE 2-continued

| Entry | Binder (Wt %) | Al$_2$O$_3$ wt % | ZnO wt % | CuO wt % | Length of Experiment to Remove H$_2$S | H$_2$S reacted | Comments |
|---|---|---|---|---|---|---|---|
| 5 | V-900(20) | 60 | 20 | | 2 h | Yes | Discoloration observed after 2 h<br>Virtually all absorbed as determined IR |
| 6 | V-900(25) | 70 | | 5 | 2 h | Yes | Discoloration observed after 2 h<br>Virtually all absorbed as determined IR |
| 7 | V-900(38) | 60 | | 2 | 3 h | Yes | Discoloration observed after 3 h<br>Virtually all absorbed as determined IR |
| 8 | V-900(30) | 50 | | 20 | 1.5 h | Yes | Discoloration observed after 1.5 h<br>Virtually all absorbed as determined IR |
| 9 | V-900(30) | 20 | | 50 | 16.5 h | Yes very slowly | Very slow little change after 2 h |
| 10 | V-900(30) | 69 | | 1 | 4 h | Yes | Discoloration observed after 2 h<br>Virtually all absorbed as determined IR |

Al$_2$O$_3$ = calcined at 550° C. and then acid treated
V-900 = LaRoach V-900 gel alumina (colloidal alumina)

EXAMPLE 4

TCE adsorption and TCLP extraction procedures were performed as follows. A 20.0114-gram (about 24.50 mL bed volume) sample of the colloidal alumina and Al$_2$O$_3$/CuO/MnO$_2$ combination particle of Table 2, entry 1, after treatment with TCE was wet packed into a 50-mL buret (with removable stopcock) plugged with glass wool. The sample was charged with five bed volumes of water. The sorbent material was then quantitatively transferred into the Zero Headspace Extractor (ZHE) apparatus into which 200 mL of water was added, appropriately sealed and agitated for 18 hours. The filtered solution was collected in two 100 mL vials, stored in the refrigerator at 4° C. until analysis by GC/MS. The Finnigan MAT Magnum ion trap GC/MS equipped with a Tekmar liquid sample concentrator (LSC 2000) was used for analysis.

The calibration curve procedure was as follows. A freshly prepared 50 ppm TCE stock solution was obtained by dissolving 34.2 μl spectrophotometric grade TCE (Aldrich) in 20 ml HPLC grade methanol (Fisher) followed by dilution to a liter. Dilution of this solution (1000 μl: IL) resulted in a 50 ppb TCE stock solution. All dilutions were accomplished using deionized water. A calibration curve was constructed by purging 1.0, 0.50, 0.20, 0.10, and 0.050 ppb TCE solutions.

The results are set forth below in Table 3.

TABLE 3

| Sorbent Sample | TCE found, ppb | TCE Detection limit, ppb |
|---|---|---|
| Table 2, entry 1 | Nd[a] | 0.0050 |

[a] = Not detected. The fact that TCE in the sample is less that 500 ppb (EPA TCLP limit) characterizes it as a nonhazardous waste with respect to TCE.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for reducing or eliminating the amount of a contaminant from a liquid or gas stream comprising contacting an adsorbent and/or catalyst and binder system with the contaminant in the stream for a sufficient time to reduce or eliminate the amount of contaminant from the stream, wherein the system is prepared by the steps comprising
    i) mixing components comprising
        a) a binder comprising a colloidal metal oxide or colloidal metalloid oxide capable of cross-linking to component (b).
        b) an oxide adsorbent and/or catalyst particle, and
        c) an acid, and
    ii) removing a sufficient amount of water from the mixture to cross-link components a and b to form an adsorbent and/or catalyst and binder system.

2. An adsorbent and/or catalyst and binder system comprising a binder that has been cross-linked with at least one type of oxide adsorbent and/or catalyst particle.

3. The system of claim 2, wherein the binder is colloidal alumina and the particle comprises aluminum oxide, copper oxide, and manganese dioxide particles.

4. The system of claim 2, wherein the binder is colloidal alumina and the particle comprises aluminum oxide and carbon.

5. The system of claim 2, wherein the binder is colloidal alumina and the particle comprises copper oxide and manganese dioxide.

6. The system of claim 2, wherein the binder is colloidal alumina and the particle comprises aluminum oxide, copper oxide, manganese dioxide and carbon.

7. The system of claim 2, wherein the binder is colloidal silica and the particle comprises aluminum oxide, copper oxide and manganese dioxide.

8. The system of claim 2, wherein the catalyst and binder system comprises colloidal alumina, aluminum oxide, and one or more of the oxide particles of V$_2$O$_5$, WO$_2$, WO$_3$, TiO$_2$, Re$_2$O$_7$, AS$_2$O$_3$, AS$_2$O$_5$, OsO$_4$, Sb$_2$O$_3$ or mixtures thereof.

9. The system of claim 2, wherein the catalyst and binder system comprises colloidal alumina, aluminum oxide, and one or more of the oxide particles of V$_2$O$_5$, ZrO$_2$, TiO$_2$, MgO, ThO$_2$, lanthanide oxides or mixtures thereof.

10. The system of claim 2, wherein the catalyst and binder system comprises colloidal alumina, aluminum oxide, and one or more of the oxide particles of CuO, ZnO, Ag$_2$O, AgO, CdO, SnO$_2$, PbO, V$_2$O$_5$, ZrO$_2$, MgO, ThO$_2$, lanthanide oxides, or mixtures thereof.

11. The system of claim 2, wherein the catalyst and binder system comprises colloidal alumina, aluminum oxide, and one or more of the oxide particles of $MnO_2$, $Fe_2O_3$, $Fe_3O_4$, $Ru_2O_3$, $OsO_4$, CoO, $Co_2O_3$, RuO, NiO or mixtures thereof.

12. The system of claim 2, wherein the catalyst and binder system comprises colloidal alumina, aluminum oxide, and one or more of the oxide particles of $Fe_2O_3$, $Fe_3O_4$, CoO, $Co_2O_3$ or mixtures thereof.

13. The system of claim 2, wherein the catalyst and binder system comprises colloidal alumina, aluminum oxide, and one or more of the particle of zeolite, $ThO_2$ or mixtures thereof.

14. The system of claim 2, wherein the catalyst and binder system comprises colloidal alumina, aluminum oxide, and one or more of the oxide particles of MgO, $ThO_2$ or mixtures thereof.

15. The system of claim 2, wherein the binder comprises a colloidal metal oxide or colloidal metalloid oxide.

16. The system of claim 2, wherein the binder comprises colloidal alumina, colloidal silica, or a mixture thereof.

17. The system of claim 2, wherein the particle comprises aluminum oxide, silicon dioxide and activated carbon.

18. The system of claim 2, wherein the binder is colloidal alumina and the particle comprises aluminum oxide and copper oxide.

19. The system of claim 2, wherein the binder is colloidal alumina and the particle comprises aluminum oxide and silver oxide.

20. The system of claim 2, wherein the binder comprises colloidal alumina, colloidal silica, a colloidal metal oxide wherein the metal is iron, or a mixture thereof.

21. A method for reducing or eliminating the amount of a contaminant from a liquid or gas stream comprising contacting the system of claim 2 with the contaminant in the stream for a sufficient time to reduce or eliminate the amount of contaminant from the stream.

22. The method of claim 21, wherein the stream is a liquid.

23. The method of claim 21, wherein the stream comprises water.

24. The method of claim 21, wherein the stream is a gas.

25. The method of claim 21, wherein the stream comprises air or natural gas.

26. The method of claim 21, wherein the contaminant from the liquid or gas stream is reduced or eliminated by a catalytic reaction.

27. The method of claim 21, wherein the contaminant from the liquid or gas stream is reduced or eliminated by an adsorption reaction.

28. The method of claim 21, wherein the contaminant is acetone, ammonia, benzene, carbon monoxide, chlorine, hydrogen sulfide, trichloroethylene, 1,4-dioxane, ethanol, ethylene, formaldehyde, hydrogen cyanide, hydrogen sulfide, methanol, methyl ethyl ketone, methylene chloride, nitrogen oxide, propylene, styrene, sulfur dioxide, toluene, vinyl chloride, arsenic, cadmium, chlorine, 1,2-dibromochloropropane, iron, lead, phosphate, radon, selenium, or uranium.

29. The method of claim 21, wherein the contaminant is hydrogen sulfide.

30. The system of claim 2, wherein the binder is colloidal alumina.

31. The system of claim 30, wherein the binder is from 1% to 99.9% by weight of the mixture.

32. The system of claim 30, wherein the binder is colloidal alumina and is from 10% to 35% by weight of the mixture.

33. The system of claim 30, wherein the oxide adsorbent and/or catalyst particle comprises at least two different types of oxide adsorbent and/or catalyst particles.

34. The system of claim 30, wherein the oxide adsorbent and/or catalyst particle comprises at least three different types of oxide adsorbent and/or catalyst particles.

35. The system of claim 30, wherein the oxide adsorbent and/or catalyst particle comprises a metal oxide particle.

36. The system of claim 30, wherein the oxide adsorbent and/or catalyst particle comprises a non-ceramic, porous metal oxide particle.

37. The system of claim 30, wherein the oxide adsorbent and/or catalyst particle comprises particles of an oxide of aluminum, titanium, copper, vanadium, silicon, manganese, iron, zinc, zirconiumn, magnesium, tin, lead, arsenic, antimony, or zeolite, or a mixture thereof.

38. The system of claim 30, wherein the oxide adsorbent and/or catalyst particle comprises a mixture of at least two metal oxide particles having the same metal with varying stoichiometry and oxidation states.

39. The system of claim 30, wherein the oxide adsorbent and/or catalyst particle comprises $Al_2O_3$, $TiO_2$, CuO, $Cu_2O$, $V_2O_5$, $SiO_2$, $MnO_2$, $Mn_2O_3$, $Mn_3O_4$, ZnO, $WO_2$, $WO_3$, $Re_2O_7$, $AS_2O_3$, $As_2O_5$, MgO, $ThO_2$, $Ag_2O$, AgO, CdO, $SnO_2$, PbO, FeO, $Fe_2O_3$, $Fe_3O_4$, $Ru_2O_3$, RuO, $OsO_4$, $Sb_2O_3$, CoO, $Co_2O_3$, NiO or zeolite.

40. The system of claim 30, wherein the oxide adsorbent and/or catalyst particle further comprises a second type of adsorbent and/or catalyst particles of aluminum oxide, titanium dioxide, copper oxide, vanadium pentoxide, silicon dioxide, manganese dioxide, iron oxide, zinc oxide, zeolite, activated carbon, peat, zinc or tin particle.

41. A method for catalyzing the decomposition of an organic compound comprising contacting the organic compound with the system of claim 2 for a sufficient time to catalyze the degradation of the organic compound.

42. The method of claim 41, wherein the catalytic reaction is at room temperature.

43. The method of claim 41, wherein the organic compound is a chlorinated hydrocarbon.

44. The method of claim 41, wherein the organic compound is trichloroethylene.

45. A method for reducing or eliminating a contaminant from a gas stream by catalysis comprising contacting the system of claim 2 with a gas stream containing a contaminant comprising an oxide of nitrogen, an oxide of sulfur, carbon monoxide, hydrogen sulfide, or mixtures thereof for a sufficient time to reduce or eliminate the contaminant amount.

46. The method of claim 45, wherein the catalytic reaction is at room temperature.

47. A method for producing an adsorbent and/or catalyst and binder system comprising
  i) mixing components comprising
    a) a binder comprising a colloidal metal oxide or colloidal metalloid oxide capable of cross-linking with itself,
    b) a first adsorbent and/or catalyst particle that does not cross-link with the binder, and
    c) an acid,
  ii) removing a sufficient amount of water from the mixture to cross-link component a to itself, thereby entrapping and holding component b within the cross-linked binder, to form an adsorbent and/or catalyst and binder system.

48. The method of claim 47, wherein the removing is by heating or by using a drying agent.

49. The method of claim 47, wherein the removing is by heating.

50. The method of claim 47, further comprising a second adsorbent and/or catalyst particle that cross-links with the binder, thereby cross-linking the binder and the second particle and thereby entrapping and holding the first particle within the cross-linked binder and/or within the cross-linked binder and second particle.

51. The adsorbent and/or binder system made by the process of claim 50.

52. The method of claim 47, wherein component b comprises an activated carbon particle.

53. The method of claim 47, wherein component b does not contain an oxide particle.

54. The method of claim 47, wherein the binder comprises colloidal alumina, colloidal silica, or a mixture thereof.

55. The method of claim 47, wherein the binder is colloidal alumina.

56. The adsorbent and/or binder system made by the process of claim 47.

* * * * *